United States Patent

Koyano et al.

[15] 3,699,174
[45] Oct. 17, 1972

[54] PROCESS FOR PREPARING DIALKOXYALKANES

[72] Inventors: Takashi Koyano, Iruma-gun; Saburo Fukushi, Tokyo, both of Japan

[73] Assignee: Toa Nenryo Kogyo Kabushiki Kaisha, Tokyo, Japan

[22] Filed: July 28, 1969

[21] Appl. No.: 845,542

Related U.S. Application Data

[63] Continuation-in-part of Ser. No. 691,151, Dec. 18, 1967, abandoned.

[30] Foreign Application Priority Data

Feb. 8, 1967 Japan ..........................42/8098

[52] U.S. Cl. ................................................260/615 R
[51] Int. Cl. ................................................C07c 43/00
[58] Field of Search....................260/614, 615, 615 A

[56] References Cited

UNITED STATES PATENTS 1,459,177   6/1923   Carter et al.................260/614
2,042,219   5/1936   Groll et al...................260/614
2,148,437   2/1939   Coleman et al.............260/615
2,332,467   10/1943  Linn et al. ..................260/614
2,426,863   9/1947   Deebel .......................260/615

OTHER PUBLICATIONS

Rempp, Soc. Chim de France, Bull., 24 (1957) pp. 844–847
Morrison et al., Organic Chemistry, Allyn & Bacon Inc., Boston, 1966, P. 156
Organic Synthesis, Vol. IV, John Wiley & Sons, New York pp. 268–270, 1963

*Primary Examiner*—Howard T. Mars
*Attorney*—Woodhams, Blanchard and Flynn

[57] ABSTRACT

A process for producing dialkoxyalkanes by reacting a dihaloalkane with an aliphatic alcohol in the presence of at least one metal or metallic compound selected from the group consisting of metals and metallic compounds of Groups I–V and transition metals of Groups VI–VIII of the Periodic Table.

5 Claims, No Drawings

PROCESS FOR PREPARING DIALKOXYALKANES

CROSS REFERENCE TO RELATED APPLICATION

This application is a continuation in part of our copending application, Ser. No. 691 151, filed Dec. 18, 1967, now abandoned.

BACKGROUND OF THE INVENTION

1. Field of the Invention

The present invention relates to a process for preparing dialkoxyalkanes, particularly to a process for preparing dialkoxyalkanes from dihaloalkanes. More particularly, the present invention provides a novel process for preparing dialkoxyalkanes from dihaloalkanes and aliphatic alcohols.

2. Description of the Prior Art

Up to the present, the generally known processes for preparing dialkoxyalkanes have comprised reacting an alkyl bromide with the sodium salt of ethylene glycol in glycol solvent (Ind. & Eng. Chem. 18, 669–675 (1926)), methylating the sodium salt of methyl cellosolve with methyl chloride or dimethylsulfate (J. Amer. Chem. Soc., 67, 1615 (1945) and 60, 1714 (1938)) and reacting a dihaloalkane with a sodium alcoholate in the liquid phase (Bull. Soc. Chim. France 1957, pp. 844–847).

However, the first two prior processes are not advantageous from the economic point of view, because they require expensive reagents and plural reaction steps. In addition, they are troublesome to practice on an industrial basis due to difficulties in the operation. As the dialkoxyalkanes that are obtained at a substantial yield by means of the third process, by directly reacting a dihaloalkane with a sodium alcoholate, there may be mentioned compounds having relatively long chains, such as 1,6-dipropoxyhexane, 1,6-dibutoxyhexane, 1,6-dilauroxyhexane, etc. However, with regard to the preparation of 1,2-dialkoxyethanes by the reaction of 1,2-dihaloethanes with sodium alcoholates, there is disclosed in said publication only the production of 1,2-dilauroxyethane, and moreover, the yield is not sufficient for industrial practice. Thus, up to the present, there has been found no process for preparing dialkoxyalkanes having lower alkoxy groups and a short chain, such as dimethoxyethane, diethoxyethane, etc., directly from dihaloalkanes and sodium alcoholates. It is considered that in the reaction of a dihaloethane with an alkali metal alcoholate, such as lithium, sodium or potassium alcoholate, a dialkoxyalkane cannot be obtained because the dehydrohalogenation reaction of the dihaloethane is caused prior to the desired substitution reaction due to strong basicity of the alkali metal alcoholate whereby there are formed byproducts mainly composed of vinyl halide, vinyl alkyl ether, etc. Particularly, when the dihaloalkanes to be used have short chains, such as dihaloethanes, it is impossible to form dialkoxyethanes by substituting the halogens with the alkoxy groups because the dehydrohalogenation reaction proceeds vigorously due to their chemical structure.

1,2-dimethoxyethane (glyme), which is a lower dialkoxyalkane, has been noted in the field of organic synthetic chemistry as an ether solvent miscible with water and having an excellent solubility, and the demand for it has increased. Dihaloalkanes may be obtained in the petroleum chemistry industry abundantly and at a low cost. In view of the circumstances referred to above, and after intensive investigations on the preparation of dialkoxyalkanes from dihaloalkanes, the inventors have found that dialkoxyalkanes can be obtained by the direct reaction of dihaloalkanes with aliphatic alcohols. However, it has also been found that in carrying out said process simply, hydrogen halides are generated and these severely corrode the reaction apparatus. Also, the presence of hydrogen halides in the reaction system causes dehydration of alcohols or a side reaction with the reaction products, whereby the yields of the final products are lowered and the recovery of alcohols is reduced. After further investigation to overcome the above problems, the inventors have discovered that these problems can be solved by carrying out the reaction in the presence of metal(s) or metallic compound(s), as described below, and thus have achieved the present invention.

SUMMARY OF THE INVENTION

The present invention relates to a process for preparing dialkoxyalkanes in which a dihaloalkane and an alkanol are reacted at an elevated temperature, under atmospheric or higher pressure, in the presence of metal(s) or metallic compound(s) which is (are) inactive to the dihaloalkane but active to the hydrogen halide.

The dihaloalkanes which are most advantageously used in the present invention are those having one to four carbon atoms in the molecule, but dihaloalkanes having longer chains may also be used. The shorter the chain of the dihaloalkane is, the more remarkable are the effects obtained by the process of the present invention. As alkanol, those having one to four carbon atoms, for example, methanol, ethanol, propanol and butanol, are preferred, but those having five or more carbon atoms may also be used. The ratio of the amounts of dihaloalkane and alcohol used may be the stoichiometric ratio, namely, one mole of the former per two moles of the latter. However, in view of the tendency for the conversion to increase as the amount of the alcohol is increased, it is preferable in carrying out the process of the present invention to use more than two moles of alcohol per one mole of dihaloalkane. Generally, the amount of alcohol used is in the range of two to 10 moles per one mole of dihaloalkane.

As the metals or metallic compounds which are to be present in the reaction zone according to the invention, the inventors have confirmed that, as metals or metallic compounds which are inactive to dihaloalkanes but active to hydrogen halides and which absorb hydrogen halides to accelerate the reaction, there can be used at least one metal selected from the group consisting of metals of Groups I–V in the Periodic Table and transition metals of Groups VI–VIII in the same, and compounds of those metals, such as oxides, hydroxides, alcoholates, basic salts and weak acidic salts which may be dissolved in an acid to form salts. Thus, the present invention relates to a process wherein there are used metals or metallic compounds, which belong to the above-mentioned category. As metals or metallic compounds to be used in the present invention, there may be mentioned weak acid salts of alkali metals, free metals, oxides, hydroxides and basic salts of alkaline earth metals, free metals, oxides, hydroxides and basic salts of transition metals, for example, metals such as magnesium, calcium, strontium, barium, chromium, manganese, iron, cobalt and nickel, lithium carbonate, sodium bicarbonate, oxides and hydroxides of magnesium, calcium, strontium, barium, chromium, manganese, iron, cobalt and nickel, organic salts such as magnesium stearate, basic magnesium carbonate and magnesium carbonate. There may also be used metals and metallic compounds of Groups IB, IIB and IVB in the Periodic Table, for example, oxides, hydroxides and basic salts of copper, zinc, tin, lead and bismuth. The alkaline earth metals will react with the alcohol and will exist as an alcoholate rather than as the free metal in the course of the reaction. Accordingly, these metals can be used in the form of alcoholates by reacting them with alcohols in advance. Among the metals, iron and magnesium, calcium or zinc are preferably used. If iron is used, it can be in the form of granular iron or a fixed bed or iron rods. If other metals or metallic compounds are used, the physical form thereof is freely variable.

According to the present invention, improvements in the yields of dialkoxyalkanes and prevention of corrosion of the apparatus may be attained by placing said metals or metallic compounds in the reaction zone to absorb efficiently the hydrogen halides generated during the course of the reaction, thereby accelerating the reaction. Although alcohols have a tendency to be decomposed into ethers or the like at a high temperature, only a little decomposition occurs in the process according to the present invention. Accordingly, unreacted alcohols may be recovered at a good yield, according to the process of the present invention.

The amount of the metal or metallic compound used is selected to be in the range of from one to five equivalents per equivalent of the hydrogen halide which will be formed from the dihaloalkane.

As to the reaction conditions, the operating temperature is in the range of 100°–350° C., preferably, 150°–250° C. At a temperature above 350° C., a dehydrohalogenation reaction takes place, and on the other hand, at a temperature below 100° C., the reaction velocity is low so that the yield is reduced whereby the practical value of the process becomes poor. The reaction pressure is not particularly critical. The reaction may be carried out under either atmospheric or elevated pressure. The time period of the reaction may be determined suitably according to the other reaction conditions. Metal halides contained in the reaction products may be separated by conventional methods, such as distillation.

In carrying out the process of the present invention, any type of batch system or continuous system process may be employed. As a preferred procedure, there may be mentioned a process wherein a dihaloalkane is contacted with an alcohol while stirring or shaking the reaction mixture, while heating same, in the presence of any of the above metals and metallic compounds. In an industrial apparatus, either a fixed bed process or a fluidized bed process may be adopted according to the physical condition of metals or metallic compounds to be used.

As described above, according to the present invention, dialkoxyalkanes may be obtained at a high yield by the reaction of dihaloalkanes with aliphatic alcohols in the presence of said metals or metallic compounds, while corrosion of the apparatus is suppressed.

DESCRIPTION OF THE PREFERRED EMBODIMENTS

Illustrative examples of the present invention will be described below, but it will be understood that the invention is not limited thereto.

EXAMPLE 1

Into a sealable 50 ml. glass tube were charged 0.06 moles of a metal compound, 0.05 moles of dehydrated, pure 1,2-dichloroethane and 25 ml. of methanol and the tube was sealed under a nitrogen atmosphere. The tube was maintained at 200° C. for 6 hours while undergoing shaking. After cooling, the reaction products were taken out and analyzed by gas chromatography and the results as listed in Table 1 were obtained.

For comparison, the results obtained by reactions carried out under the same conditions as above, except that no metallic compound was present in the reaction system, are also listed. It was found that effects obtained by the presence of metallic compounds according to the process of the present invention are remarkable.

The velocity of the reaction carried out in a sealed tube will be somewhat lower than that in an autoclave, due to the inferior reaction efficiency resulting from the stirring procedure.

TABLE 1

| Metallic compound | 1,2-dichloroethane conversion (%) | 1,2-dimethoxyethane selectivity (%) | (yield %) | 2-chloroethyl methyl ether selectivity(%) (note 1) |
|---|---|---|---|---|
| None | 50.0 | 24.6 | (12.3) | 46.9 |
| Zinc oxide | 100.0 | 65.9 | (65.9) | 0 |
| Magnesium oxide | 84.1 | 65.3 | (54.9) | 21.9 |
| Calcium oxide | 91.6 | 46.0 | (42.1) | 12.2 |

(Note 1) 2-chloroethyl methyl ether is the intermediate product of 1,2-dimethoxyethane, and which may be converted into the latter.

EXAMPLE 2

The reaction was carried out under the same conditions as in Example 1 except that 0.01 mole of magnesium stearate, as an organic salt of an alkaline earth metal, 0.01 mole of 1,2-dichloroethane and 30 ml. of methanol were used, and the following results were obtained.

| 1,2-dichloroethane conversion (%) | 1,2-dimethoxyethane selectivity (%) | (yield %) | 2-chloroethyl methyl ether selectivity (%) |
|---|---|---|---|
| 77.8 | 39.4 | 30.6 | 19.7 |

EXAMPLE 3

Into a 500 ml. stainless steel autoclave were placed 0.6 moles of zinc hydroxide, 0.5 moles of 1,2- dichloroethane and 200 ml. of methanol. A nitrogen atmosphere was used and after sealing the autoclave, the contents were reacted, while being stirred, at 200° C. for 6 hours. The analysis of the products revealed 1,2-dichloroethane conversion 96.7 percent, 1,2-dimethoxyethane selectivity 73.5 percent (yield 71.1 percent) and 2-chloroethyl methyl ether selectivity zero.

EXAMPLE 4

Into a sealable 50 ml. glass tube were placed 0.06 moles of a metal compound as listed below, 0.05 moles of 1,2-dichloroethane and 25 ml. of methanol. A nitrogen atmosphere was supplied and the tube was sealed. The contents were reacted at 180° C. for 6 hours while undergoing shaking. After the completion of the reaction, the analysis of the products revealed the results as shown in Table 2.

TABLE 2

| Metal compound | 1,2-dichloroethane conversion (%) | 1,2-dimethoxyethane selectivity (%) | (yield %) | 2-chloroethyl methyl ether selectivity (%) |
|---|---|---|---|---|
| None | 32.5 | 18.1 | (5.9) | 59.4 |
| Tri-iron tetroxide | 43.1 | 27.0 | (11.6) | 50.5 |
| Tri-manganese tetroxide | 44.4 | 32.0 | (14.2) | 55.9 |
| Cobalt (III) oxide | 39.8 | 29.8 | (11.8) | 60.4 |
| Basic Magnesium carbonate (Note 2) | 52.0 | 29.2 | (15.2) | 52.3 |
| Lithium carbonate | 71.2 | 27.4 | (19.5) | 33.4 |
| Cupric oxide | 47.8 | 34.8 | (16.6) | 46.1 |
| Stannous oxide | 49.1 | 32.2 | (15.8) | 49.2 |

(Note 2) Instead of 0.06 moles, 0.012 moles was used as regards only the basic magnesium carbonate ($4MgCO_3 \cdot Mg(OH)_2 \cdot 5H_2O$).

EXAMPLE 5

Into a sealable 50 ml. glass tube was charged 0.03 moles of basic copper carbonate, and the reaction was carried out under the same conditions as in Example 4. The results obtained were: 1,2-dichloroethane conversion 52.2 percent, 1,2-dimethoxyethane selectivity 23.5 percent (yield 12.3 percent), 2-chloroethyl methyl ether selectivity 38.2 percent.

EXAMPLE 6

Into a 100 ml. stainless steel autoclave were charged 0.11 moles of zinc oxide, 0.10 moles of 1,4-dichlorobutane and 50 ml. of methanol. A nitrogen atmosphere was used. After sealing, the contents were heated under stirring at 200° C. for 6 hours. After the completion of the reaction, the contents were cooled to room temperature and the reactor was opened. The analysis of the products revealed a 1,4-dimethoxybutane yield of 68.5 percent.

EXAMPLE 7

The same reaction as in Example 6 was carried out in the same manner except that 0.10 moles of 1,2-dibromoethane and 50 g. of n-butanol was used instead of 1,4-dichlorobutane and methanol to obtain 1,2-dibutoxyethane at a yield of 79.7 percent.

EXAMPLE 8

Into a 200 ml. stainless steel autoclave were placed 7.0 g. of magnesium hydroxide and the inside of the autoclave was purged three times with nitrogen gas. 10.1 g. of refined anhydrous dichloroethane and 80 ml. of anhydrous methanol were introduced into the autoclave. After closing the autoclave, the contents were maintained at 200° C. with stirring for 6 hours and the reaction product was collected after cooling. Seven grams (yield 76 percent) of 1,2-dimethoxyethane were obtained. Hydrogen chloride was not detected in the product and the presence of metal due to the dissolution of the inner wall of the autoclave was almost undetectable.

EXAMPLE 9

When 13.5 g. of iron powder, 9.9 g. of dichlorethane and 80 ml. of anhydrous methanol were used to carry out the reaction under the same conditions as described in Example 8, 6.6 g. (yield 73 percent) of 1,2-dimethoxyethane were obtained.

EXAMPLE 10

The following table indicates the results obtained by carrying out the reaction under the same conditions as described in Example 8 using 9.9 g. of dichloroethane and 80 ml. of anhydrous methanol.

TABLE 3

| Metal or metallic compound | Amount used (g.) | Products (g.) 1,2-dimethoxyethane | $\beta$-chloroethyl methyl ether |
|---|---|---|---|
| Manganese powder | 11.0 | 4.3 (yield 48%) | 1.4 |
| Cobalt hydroxide | 27.9 | 4.1 (yield 45.5%) | 0.5 |

EXAMPLE 11

When 7.0 g. of magnesium hydroxide, 9.8 g. of dichloroethane and 80 ml. of anhydrous methanol were kept at 180° C. for 18 hours in the same procedure as described in Example 8, 5.55 g. (yield 62 percent) of 1,2-dimethoxyethane and 1.17 g. of $\beta$-chloroethyl methyl ether were obtained.

EXAMPLE 12

Magnesium methylate was prepared as described below in a 200 ml. stainless steel autoclave. Into this were added 9.9 g. of dichloroethane under a stream of nitrogen. After closing the autoclave, the mixture was kept at 220° C. with stirring for 6 hours, and then cooled. The reaction product was collected and shown to be 1,2-dimethoxyethane (5.6 g. – yield 62 percent) by analysis.

In preparing the above-mentioned magnesium methylate, 4.0 g. of magnesium ribbons were washed with dilute hydrochloric acid and then with water and their surfaces were polished after drying. The ribbons were then placed in the autoclave, and 80 ml. of methanol were added under nitrogen. The mixture was kept at 100° C. for an hour and then cooled to room temperature. Hydrogen was drawn off, and the resulting magnesium methylate was subjected to the reaction with dichloroethane.

EXAMPLE 13

The reaction was carried out under the same conditions as described in Example 8 except using 12.7 g. of 1,4-dichlorobutane, 80 ml. of methanol and 7.0 g. of magnesium hydroxide. 5.0 g. (yield 27.2 percent) of 1,4-dimethoxybutane were obtained.

The embodiments of the invention in which an exclusive property or privilege is claimed are defined as follows:

1. A process for preparing a dialkoxyalkane having the alkoxy radicals situated on different carbon atoms which comprises reacting a dihaloalkane having one to four carbon atoms and having the halogens situated on different carbon atoms with an alkanol having from one to four carbon atoms, at a temperature of 100° to 350° C., in a sealed vessel and in the presence of a metal compound selected from the group consisting of metallic manganese; an oxide and a hydroxide of a metal selected from the group consisting of iron, cobalt, tin, copper and manganese; and a basic carbonate of copper.

2. A process according to claim 1 wherein the amount of said metal compound is selected in the range of from one to five equivalents per equivalent of hydrogen halide formed from the dihaloalkane.

3. A process according to claim 1 wherein said metal compound is selected from the group consisting of the oxides and hydroxides of cobalt and manganese.

4. A process according to claim 1 wherein said metal compound is manganese metal.

5. A process according to claim 1 wherein said metal compound is cobalt hydroxide.

* * * * *